UNITED STATES PATENT OFFICE.

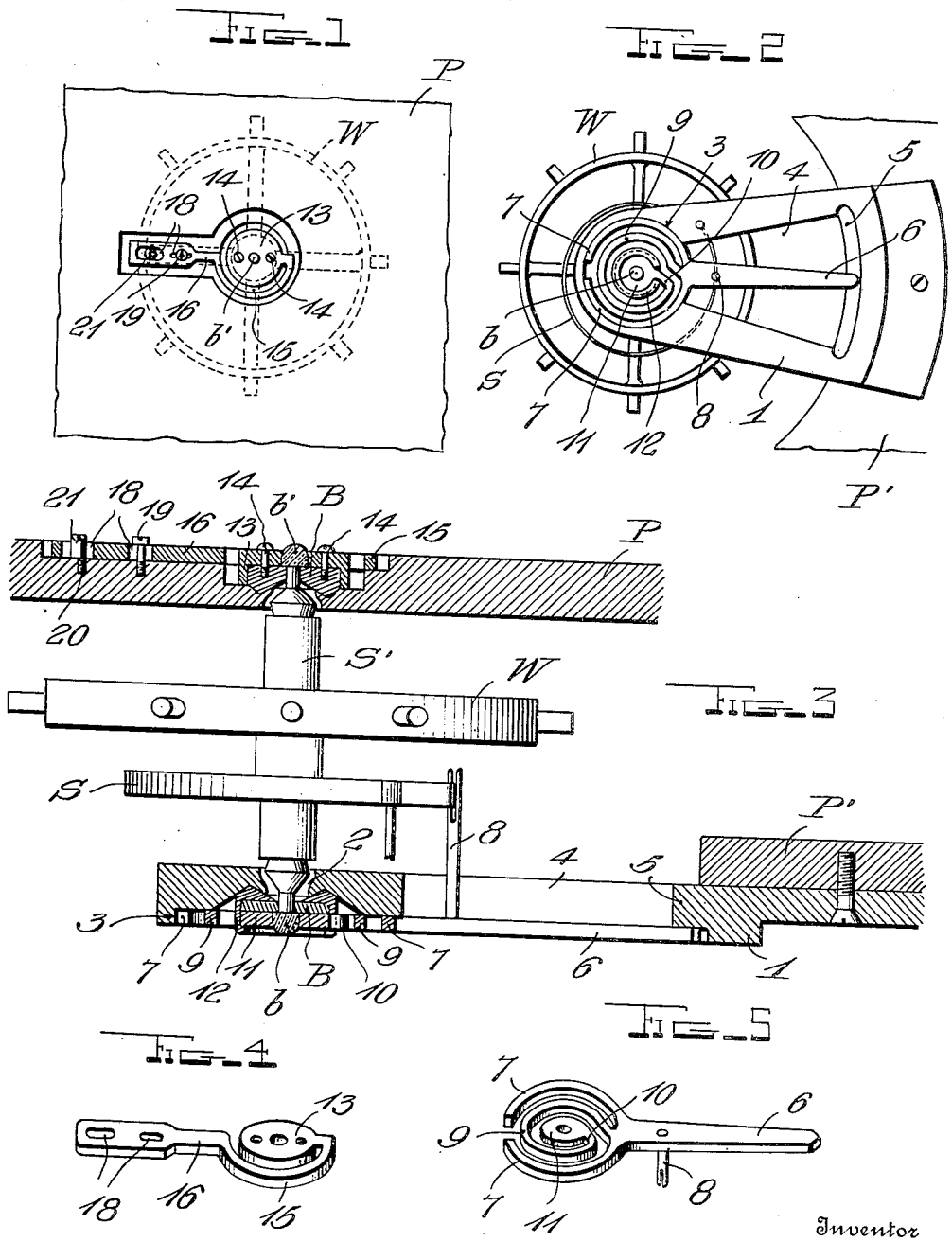

THEOPHILE SOKOLOWSKI, OF DETROIT, MICHIGAN, ASSIGNOR OF ONE-HALF TO E. F. MARITZ, OF ST. LOUIS, MISSOURI.

COMBINED RESILIENT SUPPORT FOR WATCH STAFF-BEARINGS AND REGULATING-FINGERS.

1,128,068.  Specification of Letters Patent.  Patented Feb. 9, 1915.

Application filed April 13, 1914. Serial No. 831,585.

*To all whom it may concern:*

Be it known that I, THEOPHILE SOKOLOWSKI, a citizen of the United States, residing at Detroit, in the county of Wayne and State of Michigan, have invented certain new and useful Improvements in Combined Resilient Supports for Watch Staff-Bearings and Regulating-Fingers; and I do declare the following to be a full, clear, and exact description of the invention, such as will enable others skilled in the art to which it appertains to make and use the same.

My invention relates to improvements in watches, clocks, and analogous instruments employing balance wheels and staffs therefor.

The main object of the invention is to provide simple and efficient means whereby the above mentioned balance wheel staff may be yieldingly supported, therefore compensating for various shocks and jars which would otherwise impart injury to the bearings of said staff.

A still further object of the invention is to so construct one of the bearing supports as to cause the same not only to act as a yielding support for its bearing but to yieldingly lock the regulating finger which regulates the tension of the hair spring, in any one of its adjusted positions.

With the above objects in view, the invention resides in certain novel features of construction and combination herein described and claimed and shown in the drawings wherein:—

Figure 1 is a face view of a portion of the works of a watch showing one manner of yieldingly supporting a bearing for the balance wheel staff; Fig. 2 is a rear elevation of a portion of the works showing the construction which I employ for yieldingly supporting the opposite end of said staff and which acts also to lock the regulating finger in adjusted position; Fig. 3 is an enlarged vertical section taken through the bearings at the opposite ends of the spindle and through the parts adjacent thereto; and Figs. 4 and 5 are enlarged detail perspective views of the bearing supports illustrated respectively in Figs. 1 and 2.

In the accompanying drawings, I have illustrated a portion of the face plate P of a watch, a portion of the rear plate P', the balance wheel W, hair spring S and the usual bearings B for the staff S'. It is to yieldingly support the bearings B and therefor the staff S' and the balance wheel W, that I employ the means to be described.

Coacting with portions of the rear plate P' is the usual bridge plate 1 which is here shown as having an opening 2 through which one of the reduced ends of the staff S' is adapted to pass, the outer face of said bridge plate being provided with a substantially circular recess 3 which communicates with an opening 4 which is of substantially triangular shape and extends entirely through said bridge plate, the edge of said opening 4 remote from the recess 3, being provided with an inwardly extending flange 5 upon which a regulating finger 6 is adapted to rest.

As clearly shown in Figs. 2 and 5, the finger 6 is provided with a pair of semi-circular spring arms 7 which are formed integral with its inner end and frictionally contact with the annular wall of the recess 3, thereby yieldingly locking said finger in any one of its adjusted positions which may be necessary in order to properly regulate the tension of the hair spring S, said finger being provided with a split stud 8 which projects through the opening 4 and straddles said spring (see Fig. 3). As clearly shown in the various figures of the drawings, the curved arms 7 are spaced concentrically from the opening 2 through which one of the reduced ends of the staff S' projects, said arms thus encircling one of the jewel bearings B which are provided for said staff. I am aware of the fact that yielding supports have heretofore been manufactured for the purpose of relieving said jewel bearings of undue jars but I contemplate the provision of a resilient bearing support in connection with the curved arms 7 and the regulating finger 6, the tension of these two features reducing the number of parts required in the manufacture of a time piece and yet performing the same functions for which the usual yielding bearing supports and regulating fingers are employed. In carrying out the above end, I provide a substantially circular spring 9 which is integrally united with the inner end of the regulating finger 6 and lies within the curved arms 7, the inner end of said spring being bent inwardly as indicated at 10 and formed into an integral eye 11 in which the cap bearing $b$ of one of the bearings B is located, the main portion of said bearing being secured in position by means of a substantially cup-shaped member 12 whose flange is bent inwardly to prevent its removal from the eye 11. As clearly shown in Fig. 3, the inner side of said cup-shaped member inclines inwardly toward the center of the staff S' and toward the inner side of the bridge plate 1, said bridge plate being suitably shaped to receive said inclined portion.

From the foregoing description and careful examination of the accompanying drawings, it will be readily understood that various shocks and jars which would otherwise be incurred by the staff and balance wheel, will be received by the spring 9, thereby preventing breakage of the bearing B, carried by the bridge plate, and that the device also acts as a simple and efficient means for yieldingly locking the regulating finger 6 against undue movement.

In Figs. 1 and 4 and at one side of Fig. 3, I have shown the form of yielding support which I employ in connection with the face plate P. For this purpose, I have illustrated the support for the bearing B in the form of a cup-shaped member 13 which is provided with a central opening for the reception of the cap bearing $b'$ at this end of the staff S' and with a pair of spaced openings through which fastening screws 14 project for holding the main bearing jewel in position. The member 13 is provided with a semi-circular resilient arm 15 which terminates in a radially extending shank 16 which has its free end flattened and provided with a pair of slots 18 through which fastening screws 19 and 20 are inserted for the purpose of adjusting said member 13. As clearly shown in Fig. 3, the screw 20 is provided with an eccentric head 21 which is disposed within one of the slots 18 while its threaded shank is engaged with the plate P. The operation in this form of support, as will be readily understood, also acts to relieve the staff S' and balance wheel W of unnecessary jars.

I have described my invention with considerable minuteness but I do not wish to be limited to details other than those amplified in the appended claim.

Having thus described my invention, what I claim as new and desire to secure by Letters Patent is:—

A device of the character described comprising a pair of semicircular arms united to produce a split ring, a finger projecting radially outward from said split ring at the juncture of its curved arms, a bearing located centrally in said split ring, and a spring uniting said bearing with said split ring.

In testimony whereof I have hereunto set my hand in presence of two subscribing witnesses.

THEOPHILE SOKOLOWSKI.

Witnesses:
 MICHAEL BURSEK,
 ADAM MICHALSKI.